Figure 1:
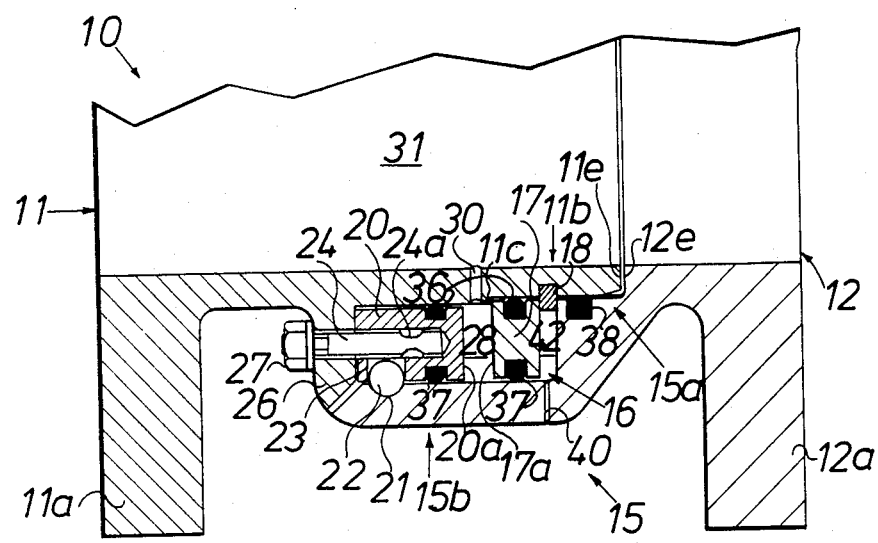

United States Patent [19]

Thomson

[11] Patent Number: 4,501,287

[45] Date of Patent: Feb. 26, 1985

[54] BREAKAWAY COUPLING

[75] Inventor: John G. Thomson, Nottingham, England

[73] Assignee: Gall Thomson Maritime Limited, London, England

[21] Appl. No.: 348,061

[22] PCT Filed: Jan. 17, 1981

[86] PCT No.: PCT/GB81/00007

§ 371 Date: Feb. 11, 1982

§ 102(e) Date: Feb. 11, 1982

[87] PCT Pub. No.: WO81/03690

PCT Pub. Date: Dec. 24, 1981

[30] Foreign Application Priority Data

Jun. 16, 1980 [GB] United Kingdom ............... 8019613

[51] Int. Cl.³ ..................... F16K 13/04; F16L 35/00
[52] U.S. Cl. ..................... 137/68 R; 285/3; 285/95; 285/DIG. 1; 137/71
[58] Field of Search ............ 285/2, 3, 4, 95, DIG. 1; 137/68 R, 71

[56] References Cited

U.S. PATENT DOCUMENTS 2,406,662 8/1946 Burchett.
3,889,985 6/1975 Gartmann ............................ 285/95
3,921,656 11/1975 Meisenheimer et al. ............ 137/68
4,059,288 11/1977 Mohr ..................................... 285/2
4,071,268 1/1978 Halling et al. ....................... 285/95
4,326,555 4/1982 Thomson ......................... 137/68 R

FOREIGN PATENT DOCUMENTS 6278 9/1980 European Pat. Off.
177719 11/1906 Fed. Rep. of Germany.
2051993 1/1981 United Kingdom.

Primary Examiner—Richard J. Scanlan, Jr.
Attorney, Agent, or Firm—Harding, Earley, Follmer & Frailey

[57] ABSTRACT

A breakaway coupling for joining together two pipes the coupling having at least two separable parts, through which a conduit extends along which fluid is to be conveyed, one part being adapted for connection to one pipe and the other part being adapted for connection to the other pipe, the two separable parts being secured together by frangible means, the parts defining therebetween a fluid chamber in fluid pressure communication with the conduit, the chamber serving to subject the parts to a fluid pressure force for urging the parts together.

7 Claims, 5 Drawing Figures

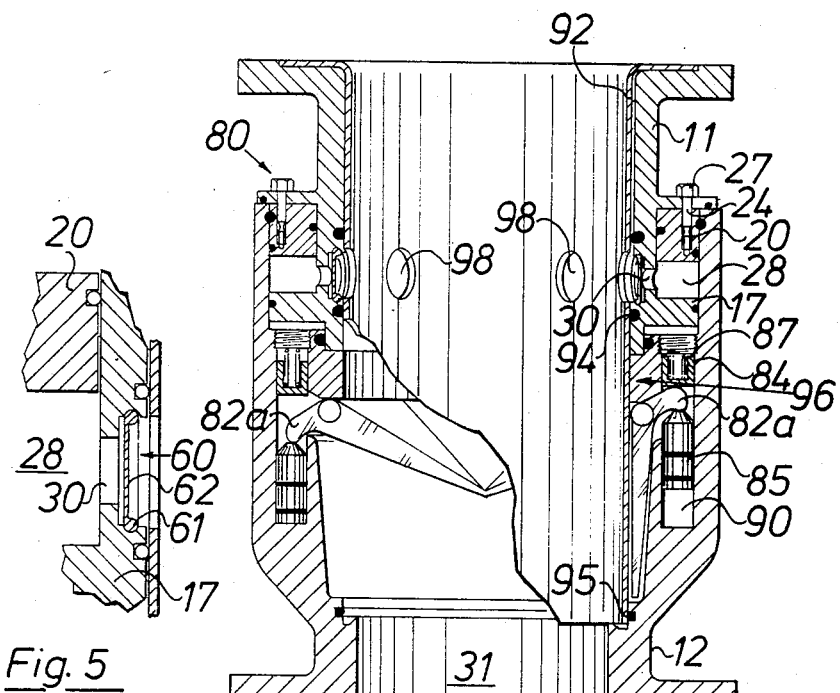
Fig. 5
Fig. 3
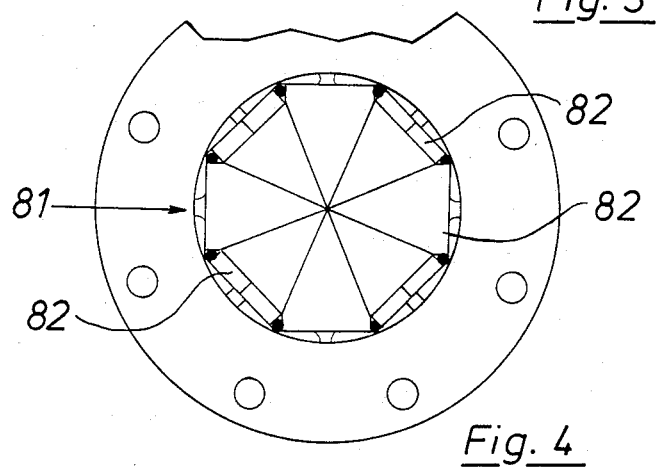
Fig. 4

BREAKAWAY COUPLING

The present invention relates to a breakaway pipe coupling.

It is desirable in pipe lines conveying fluids such as oil or gases to ensure that the pipe line breaks at predetermined locations in the event of the pipe line being stretched, for instance as may happen at sea when an oil tanker is loading/unloading at a quayside.

For this purpose it has been proposed to provide frangible bolts for connecting the connecting flanges of lengths of piping so that when the piping is stretched the bolts break in preference to the body of the pipes.

Although such a construction works, there is one major drawback, namely, if there is an internal surge of pressure within the fluid being conveyed, for instance on the rapid shutting off of flow, the resultant pressure wave may be sufficiently strong to cause breaking of the bolts.

It is therefore a general object of the present invention to provide a breakaway pipe coupling which functions to separate only when the pipeline is stretched.

According to one aspect of the present invention there is provided a breakaway coupling for joining together two pipes the coupling having at least two separable parts, through which a conduit extends along which fluid is to be conveyed, one part being adapted for connection to one pipe and the other part being adapted for connection to the other pipe, the two separable parts being secured together by frangible means, the parts defining therebetween a fluid chamber in fluid pressure communication with the conduit, the chamber serving to subject the parts to a fluid pressure force for urging the parts together. Preferably the fluid pressure force for urging the parts together is at least as great as the fluid pressure force within the conduit urging the parts apart.

Figure 2:
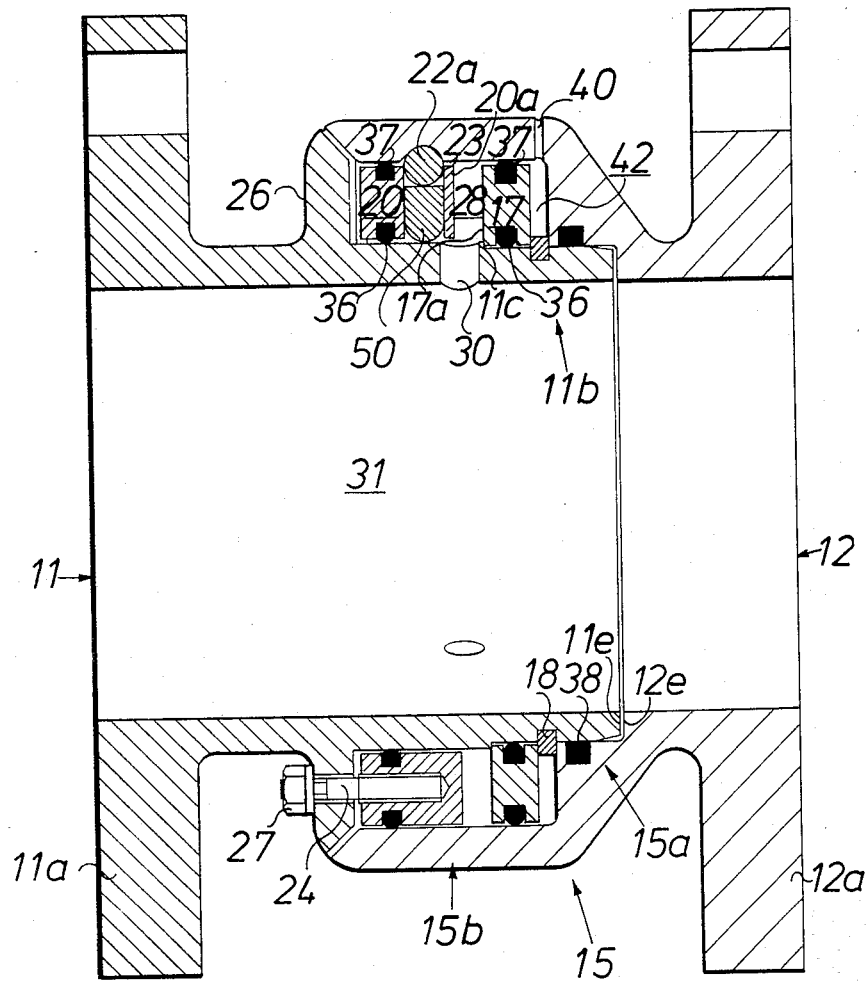

Reference is now made to the accompanying drawings, in which:

FIG. 1 is a part axial section through a first embodiment according to the present invention, FIG. 2 is an axial section through a second embodiment according to the present invention, FIG. 3 is a longitudinal section of a third embodiment according to the present invention, FIG. 4 is an end view of the embodiment shown in FIG. 3, FIG. 5 is a part sectional view of the embodiment shown in FIG. 3.

Referring initially to FIG. 1 there is shown a breakaway pipe coupling 10 including two separable halves 11 and 12 respectively. Both halves 11, 12 have annular end flanges 11a, 12a respectively for bolting to end flanges of pipes (not shown) which are to be coupled together by the coupling 10.

Coupling half 12 has a sleeve 15 which has a first portion 15a which, receives the end portion 11b of coupling half 11 and a second portion 15b which is radially spaced from the outside face of coupling half 11 to define an annular space 16. The end portion 11b is of reduced diameter to define a shoulder 11c against which an annular piston in the form of a ring 17 abuts. The ring 17 is prevented from axial movement relative to coupling half 11 by a circlip 18.

A second annular piston in the form of ring 20 is received in the annular space 16 and is restrained from axial movement within sleeve portion 15b by virtue of a series of balls 22 (only one of which is shown) spaced circumferentially about the ring 20. Each ball 22 is received in a radially extending bore 23 and projects therefrom into an annular groove 21 formed in sleeve portion 15b.

Each ball 22 is prevented from moving radially inwards by virtue of a threaded stud 24 which is threadedly received in ring 20 and projects axially therefrom to extend through a peripheral flange 26 formed on coupling half 11. A nut 27 is received on each stud so that the coupling halves 11, 12 are secured to one another via each stud and ring 20. Each stud is provided with a waisted portion 24a which defines a frangible portion.

Ring 20 and ring 17 are spaced from one another so as to define an annular fluid chamber 28 and radially extending bores 30 are provided circumferentially around coupling half 11 for providing pressure communication between annular chamber 28 and fluid conduit 31.

Bores 30 may be closed by a diaphragm 60, for instance as illustrated in FIG. 5 so that chamber 28 is isolated from fluid flowing along conduit 31 in order to prevent debris carried by the fluid flowing along conduit 31 from settling out in chamber 28. Accordingly, chamber 28 may be filled with a fluid which is different to that flowing along conduit 31. The diaphragm 60 may therefore be of any suitable construction which enables fluid pressure to be transmitted between conduit 31 and and chamber 28. The diaphragm shown in FIG. 5 includes an annular ring 61 across which extends a relatively thin membrane 62. The ring 61 and membrane 62 may be made integrally from a suitable material such as a plastics material or a metal.

Fluid pressure acting on opposed faces 20a and 17a tends to urge the coupling halves together whilst fluid pressure acting within the conduit 31 tends to urge the coupling halves apart. The area of opposed faces 20a, 17a is chosen to be at least as large as the cross-sectional area of the conduit 31 so the resultant fluid force acting to axially move the coupling halves is substantially zero. However it will be appreciated that these areas may be varied so as to give a resultant force which either urges the coupling halves apart or urges them together.

Ring 20 and ring 17 are provided with seals 36, 37 respectively so as to prevent fluid leakage from annular chamber 28. A seal 38 is provided between end portion 11b and sleeve portion 15a in order to prevent fluid leakage from conduit 31.

Venting bores 40 are provided in sleeve portion 15b for venting the annular space 42. These vents prevent the creation of a vacuum on separation of the coupling halves and also prevent build up of fluid pressure in the event of failure of seal 38.

In use when the two coupling halves are urged axially apart by a physical pull, the studs 24 are placed under stress. The frangible portion of the studs are designed to fracture at a predetermined load and upon fracturing each stud is axially withdrawn from ring 20 and ring 17 is moved into contact with ring 20. Due to the withdrawal of studs 24 the balls 22 are permitted to enter bores 23 and so leave groove 21 as the ring 17 urges ring 20 axially out of sleeve portion 15b. Thus the coupling halves 11, 12 are completely separated.

In FIG. 2, a second embodiment is illustrated and parts similar to those in the first embodiment are designated by the same reference numerals.

In the second embodiment, the balls 22 are seated in individual recesses 22a and are held in position within the bores 23 by means of a plunger 50. Each fluid bore 30 is enlarged and positioned so that on breaking of frangible bolts 24 the bores 30 align with plungers 50 which are urged through bores 30 by each ball leaving its recess 22a.

A third embodiment is shown in FIGS. 3 and 4 which shows a breakaway coupling 80 constructed as described above with reference to FIG. 1 (and which may be modified in accordance with FIG. 2) and additionally includes a valve means 81 which on separation of parts 11 and 12 automatically closes the conduit 31 in order to prevent excessive spillage of fluid from the conduit 31.

The valve means 81 includes a plurality of petal elements 82 each of which is pivotally mounted in the coupling part 12 for movement between a fully retracted position as seen on the right hand side of FIG. 3 to a fully extended position as shown on the left hand side of FIG. 3.

In their fully extended position, all the petal elements abut one another to form a cone shape facing the direction of flow of fluid along conduit 31 so that fluid pressure in conduit 31 urges the petal elements into abutment.

Each petal element 82 is provided with an actuation arm 82a which is acted upon by a pair of opposed pistons 84, 85 respectively which are housed in a bore 86 formed in coupling part 12. As seen in FIG. 3, piston 84 is biased by a spring 87 to move the actuation arm 82a to move its petal element toward its extended position. Piston 84 therefore provides the initial motive force for moving the petal element towards its fully extended position and thereafter the pressure of fluid within conduit 31 provides the motive force. The piston chamber 90 in which piston 85 moves is filled with a fluid which is permitted to escape from chamber 90 at a controlled rate on separation of the coupling parts. The pistons 85 thus control the rate at which petal elements 82 move to their fully extended positions. It is presently preferred to have eight petal elements 82 and to control their rates of movement such that four alternate petal elements 82 reach their fully extended position rapidly as shown in FIG. 4 so as to form a bridge against which the remaining petals may abut on reaching their fully extended position. In order to ensure that the full extended position of first four petal elements is correct in order that their terminal ends mutually abut, the piston 85 for each petal element is arranged to act as a stop for movement of its associated petal.

For a fuller description of the valve means and its operation reference should be made to our European Application No. 79 300153.

An internal sleeve 92 is provided which extends from the coupling part 11 and which axially withdraws from part 12 on separation of parts 11 and 12. The sleeve 92 is provided with aperture 98 for permitting fluid pressure communication between conduit 31 and the bores 30.

Seals 94, 95 are provided between sleeve 92 and parts 11 and 12 so as to provide a sealed annular chamber 96 in which the valve means is housed. Chamber 96 is filled with a suitable fluid, such as a lubricating oil, to reduce the likelihood of the petal elements failing to move to their extended position after separation of parts 11 and 12.

I claim:

1. A breakaway coupling for joining together two pipes, the coupling having at least two separable parts through which a conduit extends for conveying fluid, one part being adapted for connection to one pipe and the other part being adapted for connection to the other pipe, one of the separable coupling parts having a hollow sleeve which extends about a portion of the other separable coupling part to define an annular space therebetween, the two separable coupling parts being secured together by frangible means, characterized by
    (a) a pair of opposed annular pistons located in said annular space, said pistons being spaced axially apart to define therebetween a fluid chamber,
    (b) transmission means interposed between the fluid chamber and the conduit to provide fluid pressure communication therebetween,
    (c) connection means connecting the pistons with said separable coupling parts, whereby fluid pressure in said fluid chamber urges said coupling parts together,
    (d) one or more frangible bolts securing one of said pistons to one of said separable coupling parts and
    (e) latch means detachably securing said one piston to the other of said separable coupling parts,
    (f) whereby, upon fracture of said frangible bolt or bolts, said one piston is separable from both said separable coupling parts to allow for separation of said parts, said latch means being operative to permit axial separation of said one piston and said other coupling part following fracture of the frangible bolt or bolts.

2. A breakaway coupling according to claim 1, wherein the latch means includes one or more balls partially located in said one piston and partially located in said other coupling part, said ball or balls being retained in latching position by said frangible bolts until said bolts are fractured.

3. A breakaway coupling according to claim 1, further including
    (a) radial bores formed in said one piston,
    (b) one or more balls partially located in the radial bores in said one piston and partially located in said other coupling part,
    (c) plungers disposed in said radial bores and operative to retain the one or more balls in latching position and
    (d) bores formed in said first coupling part for reception of the plungers,
    (e) said bores in said first coupling part being operative to permit the plungers to retract from said one or more balls to enable said one or more balls to retract from said other coupling part to enable separation of said one piston and said other separable coupling part.

4. A breakaway coupling according to any of claims 1 to 3, further including
    (a) at least one bore formed in said first separable coupling part to provide fluid pressure communication between the fluid chamber and the conduit and
    (b) a diaphragm located adjacent each said bore to close the bore and prevent fluid communication between said fluid chamber and said conduit while permitting fluid pressure to be transmitted therebetween.

5. A breakaway coupling according to any of claims 1 to 3 wherein the cross-sectional area of said pistons is substantially the same as the cross-section area of said conduit.

6. A breakaway coupling according to any of claims 1 to 3 wherein one of the parts includes valve means for closing said conduit on separation of said parts.

7. A breakaway coupling according to claim 6 wherein the valve means includes a plurality of petal elements each of which is pivotally mounted for movement between a retracted position and a fully extended position, the petal elements in their extended position collectively defining a cone.

* * * * *